US009699410B1

(12) United States Patent
Nagabushanam (10) Patent No.: US 9,699,410 B1
(45) Date of Patent: Jul. 4, 2017

(54) METHOD AND SYSTEM FOR DYNAMIC LAYOUT GENERATION IN VIDEO CONFERENCING SYSTEM

(71) Applicant: Wipro Limited, Bangalore (IN)

(72) Inventor: Sudhakar Getamaneni Nagabushanam, Bengaluru (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/373,857

(22) Filed: Dec. 9, 2016

(30) Foreign Application Priority Data

Oct. 28, 2016 (IN) .............................. 201641037154

(51) Int. Cl.
| | |
|---|---|
| *H04N 7/15* | (2006.01) |
| *H04N 7/14* | (2006.01) |
| *H04N 5/232* | (2006.01) |
| *H04N 5/268* | (2006.01) |
| *G10L 25/57* | (2013.01) |
| *G10L 25/78* | (2013.01) |

(52) U.S. Cl.
CPC ............. *H04N 7/147* (2013.01); *G10L 25/57* (2013.01); *G10L 25/78* (2013.01); *H04N 5/23216* (2013.01); *H04N 5/268* (2013.01); *H04N 7/15* (2013.01)

(58) Field of Classification Search
CPC combination set(s) only.
See application file for complete search history.

(56) References Cited

U.S. PATENT DOCUMENTS

| | | | |
|---|---|---|---|
| 6,850,265 B1 | 2/2005 | Strubbe et al. | |
| 2007/0064094 A1* | 3/2007 | Potekhin | H04M 3/567 348/14.08 |
| 2007/0206089 A1* | 9/2007 | Eshkoli | H04L 12/1822 348/14.02 |
| 2010/0002069 A1 | 1/2010 | Eleftheriadis et al. | |

(Continued)

FOREIGN PATENT DOCUMENTS

| | | |
|---|---|---|
| EP | 2538236 A2 | 12/2012 |
| WO | 2010059481 A1 | 5/2010 |

OTHER PUBLICATIONS

Ranjan, et al., "Automatic Camera Control Using Unobtrusive Vision and Audio Tracking", May 31, 2010, pp. 47-54, CHCCS/SCDHM, ACM.

*Primary Examiner* — Joseph J Nguyen
(74) *Attorney, Agent, or Firm* — LeClairRyan, a Professional Corporation (57) ABSTRACT

A method and system for dynamic layout generation in video conferencing system by a layout selection system is disclosed. The layout selection system set-up receives one or more feeds comprising top view of a location associated with video conference from a first camera in real-time, computes information associated with one or more participants of the video conference set-up in real-time based on the one or more feeds and one or more pre-determined parameters to map the one or more participants in the location, obtains live audio data from at least one directional microphone of a plurality of directional microphones placed in the location. The layout selection system receives live video feed from at least one second camera of a plurality of second cameras placed in the location and generate a dynamic layout for the video conference set-up based on the live video feed from the at least one second camera.

17 Claims, 6 Drawing Sheets

(56) References Cited

U.S. PATENT DOCUMENTS

| | | | |
|---|---|---|---|
| 2011/0090302 A1* | 4/2011 | Leviav | H04N 7/152 348/14.09 |
| 2012/0176467 A1* | 7/2012 | Kenoyer | H04L 29/06027 348/14.08 |

* cited by examiner

METHOD AND SYSTEM FOR DYNAMIC LAYOUT GENERATION IN VIDEO CONFERENCING SYSTEM

This application claims the benefit of Indian Patent Application Serial No. 201641037154 filed Oct. 28, 2016 which is hereby incorporated by reference in its entirety.

FIELD

The present subject matter is related in general to the field of video conference system, more particularly, but not exclusively to a method and system for dynamic layout generation in video conferencing system.

BACKGROUND

Video collaborations using Internet have increasingly become common over a past few years. In the recent scenario, real-time communication has become essential for organizations which have a geographical reach and presence across different regions. As video conferencing systems have gained immense popularity, more and more organizations are turning to virtual meetings conducted over the web to cut costs on travelling expenditure. Generally, the video display in the conferencing system is divided in to composite layouts having one or more locations or regions. The layouts for the video conference may be selected manually or automatically at the beginning of the video conference setup. However, problems exist in terms of selection of layouts dynamically in video conferencing system.

Existing techniques for video conference provides support for manual or automatic layout selection mechanism. However, in the existing scenario and with the existing technology, there is no option for generating a layout for the video conference based on any dynamic changes occurring in the location of the video conference. Often, in the existing technique, improper selection of layout leads to showing blank seats, silent or passive speakers, improper display or screen. For instance, if a participant of the video conference system leaves the conference sin between, the layout of the video conference still covers the unoccupied place of the user or the blank seat of the user. Also, in some scenarios, a participant sitting below the camera mounted for video conference may not be covered appropriately. Therefore, there is a need for a dynamic layout generation system which generates an efficient layout for the video conference system in real-time.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method for dynamic layout generation in video conferencing system. The method comprises receiving one or more feeds comprising top view of a location associated with a video conference from a first camera in real-time, computing information associated with one or more participants of the video conference in real-time based on the one or more feeds and one or more pre-determined parameters to map the one or more participants in the location, obtaining live audio data from at least one directional microphone of a plurality of directional microphones placed in the location. The live audio data is used to identify an active participant from the one or more participants speaking in the location. The method comprises receiving live video feed from at least one second camera of a plurality of second cameras placed in the location. The at least one second camera and corresponding camera settings are selected based on the computed information and the live audio data. The method comprises generating a dynamic layout for the video conference based on the live video feed from the at least one second camera.

In an embodiment, the present disclosure relates to a layout selection system for dynamic layout generation in video conferencing system. The layout selection system may comprise a processor and a memory communicatively coupled to the processor, wherein the memory stores processor executable instructions, which, on execution, may cause the layout selection system to receive one or more feeds comprising top view of a location associated with a video conference from a first camera in real-time, compute information associated with one or more participants of the video conference in real-time based on the one or more feeds and one or more pre-determined parameters to map the one or more participants in the location, obtain live audio data from at least one directional microphone of a plurality of directional microphones placed in the location. The live audio data is used to identify an active participant from the one or more participants speaking in the location. The layout selection system receives live video feed from at least one second camera of a plurality of second cameras placed in the location. The at least one second camera and corresponding camera settings are selected based on the computed information and the live audio data. The layout selection system generates a dynamic layout for the video conference based on the live video feed from the at least one second camera.

In another embodiment, a non-transitory computer-readable storage medium for dynamic layout generation in video conferencing system is disclosed, which when executed by a computing device, cause the computing device to perform operations including receiving by a data classifier, a data corpus comprising one or more words. The operations include receiving one or more feeds comprising top view of a location associated with a video conference from a first camera in real-time, computing information associated with one or more participants of the video conference in real-time based on the one or more feeds and one or more pre-determined parameters to map the one or more participants in the location, obtaining live audio data from at least one directional microphone of a plurality of directional microphones placed in the location. The live audio data is used to identify an active participant from the one or more participants speaking in the location. The operations include receiving live video feed from at least one second camera of a plurality of second cameras placed in the location. The at least one second camera and corresponding camera settings are selected based on the computed information and the live audio data. The operation includes generating a dynamic layout for the video conference based on the live video feed from the at least one second camera.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method for dynamic layout generation in video conferencing system. The present disclosure provides a layout selection system, also referred to as a layout computing device, which generates a layout dynamically for a video conference. The layout selection system provides the layout for the video conference based on inputs from a plurality of cameras and a plurality of directional microphones. Initially, the plurality of cameras and the plurality of directional microphones are initialized. Once all the devices in the conference location are initialized, the layout selection system receives one or more feeds comprising top view of a location associated with a video conference and live video feed of the location based on a selected camera from the plurality of cameras. The layout selection system also receives live audio data from the plurality of directional microphones to identify an active participant in the video conference. The inputs from the plurality of cameras and plurality of directional microphones are further utilized in real-time for generating a dynamic layout for the video conference. The dynamic layout generated for the video conference displays and focuses on the active participants and eliminates displaying of unoccupied seats and in-active speakers in the video conferencing system, thus enhancing video conferencing experience.

Figure 1:
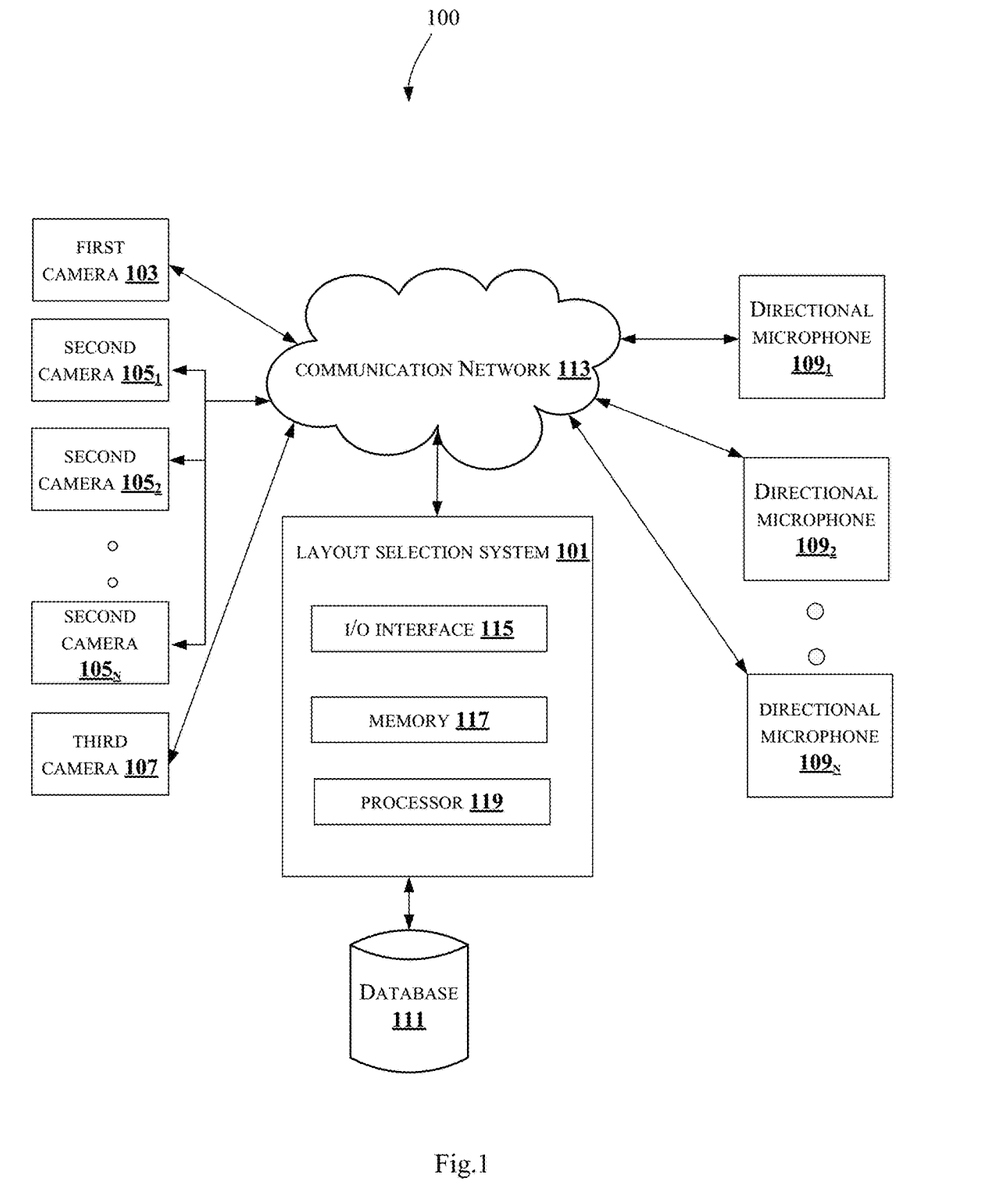
FIG. 1 illustrates an exemplary environment for dynamic layout generation in video conferencing system in accordance with some embodiments of the present disclosure.

FIG. 1 illustrates an exemplary environment for dynamic layout generation in video conferencing system in accordance with some embodiments of the present disclosure.

As shown in FIG. 1, the environment 100 comprises a layout selection system 101, a first camera 103, a second camera $105_1$, a second camera $105_2$, . . . and a second camera $105_N$ (collectively referred as a plurality of second cameras 105), a third camera 107, a directional microphone $109_1$, a directional microphone $109_2$, . . . and a directional microphone $109_N$ (collectively referred as a plurality of directional microphones 109) communicatively coupled through a communication network 113. The layout selection system 101 is also connected to a database 111. In an embodiment, the layout selection system 101 may be connected to the database 111 through a communication network (not shown in fig). In an embodiment, the layout selection system 101 may be implemented using devices including, but not limited to, a laptop, a desktop computer, a notebook, a smartphone, a tablet, a Personal Digital Assistant (PDA) and any other computing devices. The first camera 103 is a top mounted camera in the video conferencing location. The first camera 103 covers entire location where a conference is held and one or more participants in the location. The plurality of second cameras 105 may be limited angle viewing cameras which are used to cover one or more participants in the conference location. In an exemplary embodiment, the plurality of second cameras 105 focuses on active participants in the location. The third camera 107 is a wide angle viewing camera, which provides panorama view of the location. To generate a layout for the video conference, the layout selection system 101 receive one or more feeds from the first camera 103 which comprises top view of the location associated with the video conference. In an embodiment, the one or more feeds comprise video details of the entire location associated with the video conference. Based on the one or more feeds and pre-determined parameters, the layout selection system 101 computes information associated with one or more participants present in the video conference. In an embodiment, the pre-determined parameters comprise coordinate details of the location. Further, the layout selection system 101 receives live video feeds from at least one second camera of the plurality of second cameras 105. In an embodiment, the at least one second camera of the plurality of second cameras 105 focuses on a predefined area of the location based on the active participant identified in real-time from live audio data and computed information associated with one or more participants present in the video conference. Further, once the at least one second camera is selected corresponding camera settings are selected based on the live audio data and computed information. In an embodiment, the camera settings comprise zoom details, tilt angle and the position of the selected at least one second camera. The layout selection system 101 may also receive a full view of the location from a third camera 107. In an embodiment, whenever there is a switch of live feeds between the plurality of second cameras 105, the layout selection system 101 generates a layout which is the full view of the location. Further, the layout selection system 101 obtains the live audio data from at least one directional microphone of the plurality of directional microphones 109. In an embodiment, the live audio data is obtained from those directional microphones which are activated. The at least one directional microphone of the plurality of microphones 109 is activated based on a mapping of the coordinate details of the location with the one or more participants in the location. In an embodiment, the number of second cameras and the directional microphones may depend upon the location where the video conference is held. In an embodiment, if a switching of live feeds between the plurality of second cameras 105 is determined within a predefined time, the layout selection system 101 generates the full view of the location provided by the third camera 107. Once the one or more feeds from the first camera 103, plurality of second cameras 105, third camera 107 and plurality of directional microphones 109 is received, the layout selection system 101 generates the layout of the video conference dynamically.

The layout selection system 101 comprises an I/O Interface 115, a memory 117 and a processor 119. The I/O interface 115 is configured to receive one or more feeds from a first camera 103 in real-time. The I/O interface 115 receives live audio data from at least one directional microphone of a plurality of directional microphones 109. The I/O interface 115 also receives live video feed from at least one second camera of the plurality of the second cameras 105. The I/O interface 115 also receives the pre-determined coordinate details of the location from the database 111.

The received information from the I/O interface 115 is stored in the memory 117. The memory 117 is communicatively coupled to the processor 119 of the layout selection system 101. The memory 117 also stores processor instructions which cause the processor 119 to execute the instruction for dynamic layout generation in video conferencing system.

Figure 2A:
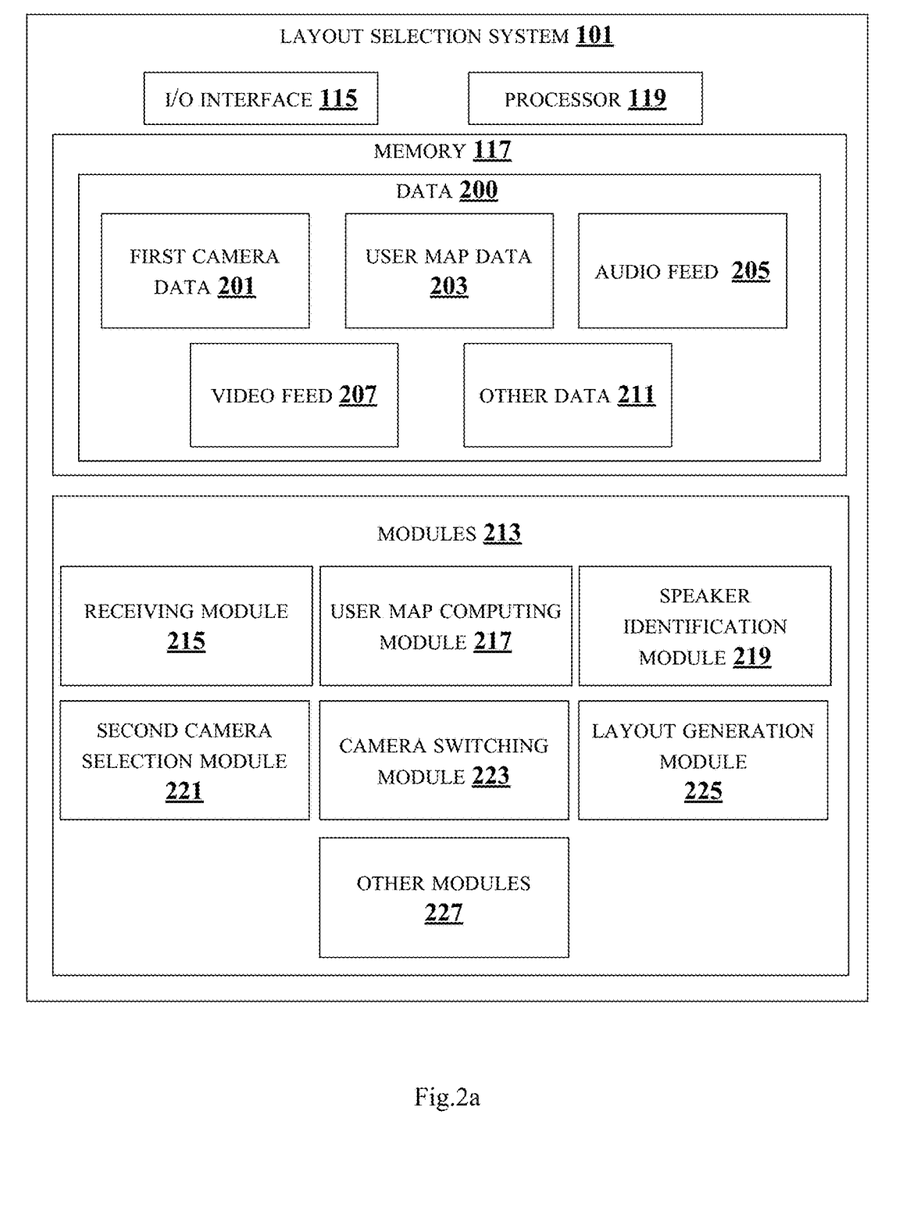
FIG. 2a shows a detailed block diagram of a layout selection system in accordance with some embodiments of the present disclosure.

FIG. 2a shows a detailed block diagram of a layout selection system in accordance with some embodiments of the present disclosure.

Data 200 and one or more modules 213 of the layout selection system 101 are described herein in detail. In an embodiment, data comprises a first camera data 201, a user map data 203, an audio feed 205, a video feed 207, a camera switching data 209 and other data 211.

The first camera data 201 comprises one or more feeds on top view of the location which is associated with the video conference. The one or more feeds are provided by the first camera 103 in real-time. In an embodiment, the one or more feeds comprise a continuous top view about entire conference location and the participants seating area.

The user map data 203 comprises information associated with one or more participants present in the video conference location. The user map data 203 comprises details on number of participants in the video conference and the seating information of each participant. In an embodiment, the user map data 203 comprises information on unoccupied seats if any in the location.

The audio feed 205 comprises audio feed from at least one directional microphone of the plurality of directional microphones 109. In an embodiment, the audio feeds are received from the at least one directional microphone in real-time. The audio feed 205 is used to generate information about the active participant from the one or more participants speaking in the video conference location.

The video feed 207 comprises video from the at least one second camera of the plurality of second cameras 105 placed in the location. The video feed 207 also comprises information about the at least on selected second camera and corresponding camera setting details. In an embodiment, the camera setting details comprises zoom details, tilt angle and position for the at least one selected second camera.

The other data 211 may store data, including temporary data and temporary files, generated by modules for performing the various functions of the layout selection system 101.

In an embodiment, the data 200 in the memory 117 are processed by the one or more modules 213 of the layout selection system 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules when configured with the functionality defined in the present disclosure will result in a novel hardware.

Figure 2B:
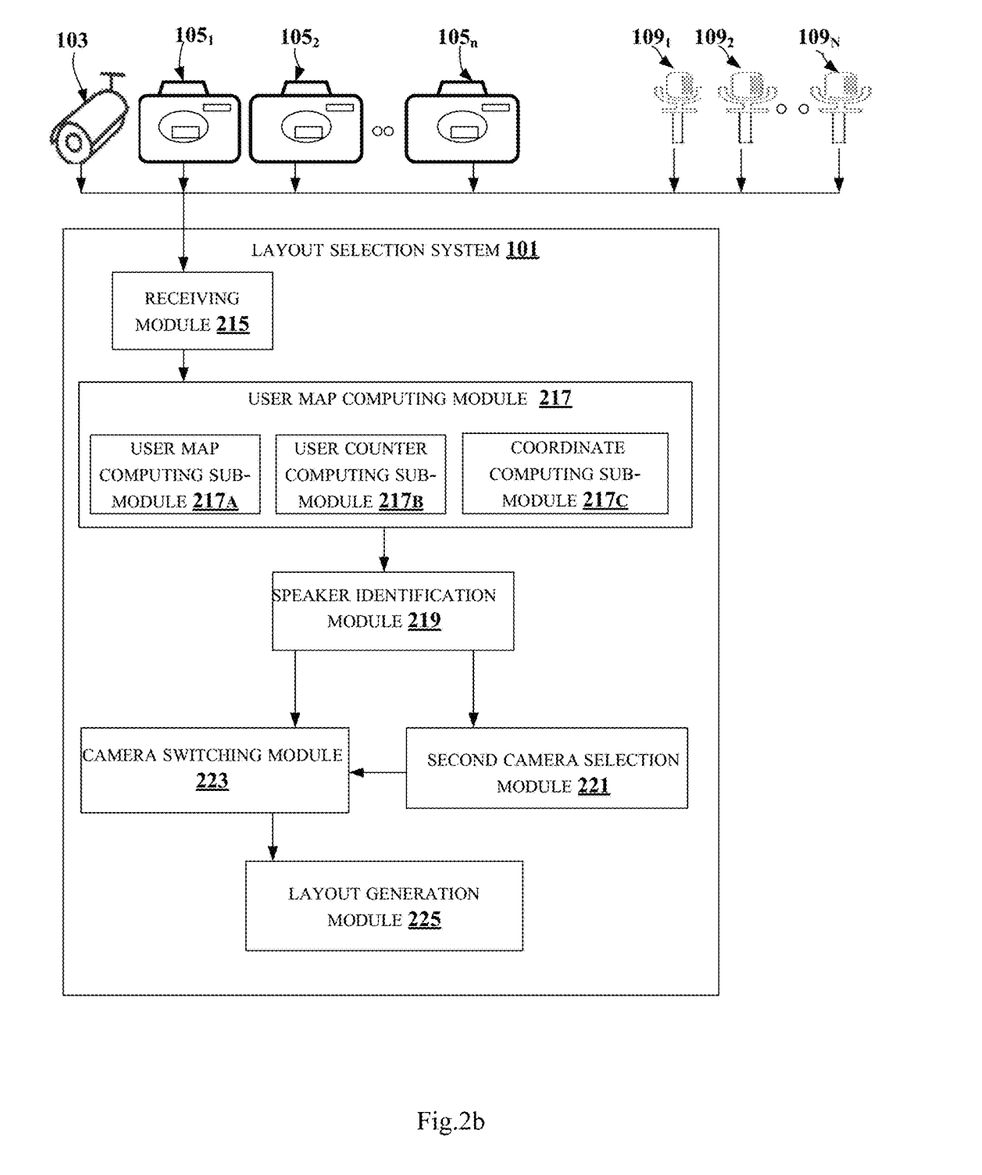
FIG. 2b shows an exemplary environment illustrating data flow between different modules of layout selection system in accordance with some embodiment of the present disclosure.

In one implementation, the one or more modules 213 may include, but is not limited to, a receiving module 215, a user map computing module 217, a speaker identification module 219, a second camera selection module 221, a camera switching module 223 and a layout generation module 225. The one or more modules 213 may also comprise other modules 227 to perform various miscellaneous functionalities of the layout selection system 101. It will be appreciated that such aforementioned modules may be represented as a single module or a combination of different modules. FIG. 2b shows an exemplary environment illustrating data flow between different modules of layout selection system in accordance with some embodiment of the present disclosure.

The receiving module 215 receives the one or more feeds comprising the top view of the location where the video conference is taking place from the first camera 103 placed in the location in real-time. The one or more feeds from the first camera 103 comprise the top view of the entire location and the one or more participants present for the video conference. The receiving module 215 receives full view of the location from the third camera 107. The full view is based on the information associated with one or more participants computed in real-time. Further, the receiving module 215 receives the live audio data from at least one directional microphone of the plurality of directional microphones 109 placed in the location. The receiving module 215 also receives the live video feeds from at least one second camera of the plurality of the second cameras 105. The at least one second camera is selected based on the live audio data.

The user map computing module 217 computes the information associated with one or more participants present in the video conference location in real-time. The user map computing module 217 comprises three sub-modules as shown in FIG. 2b, namely, user map computing sub-module 217A, user counter computing sub-module 217B and coordinate computing sub-module 217C. The coordinate computing sub-module 217C first computes the coordinates of the location associated with the video conference and stores in the database 111. The user map computing sub-module 217A maps the one or more participants present in the location with the coordinates of the location. The user map computing sub-module 217A computes where each participant is seated within the location of the video conference. In an embodiment, the user map computing sub-module 217A maps the one or more feeds from the first camera 103 to identify one or more participants in the location using a combination of characteristics of human head such as color, hair, shapes, head pattern matching etc. A person skilled in the art would understand that any other characteristics of human can be used to identify participants in with the present disclosure. Further, the use map computing 217A also computes the number of unoccupied places based on the characteristics of chair, shape, colors and outer boundary pattern matching. A person skilled in the art would understand that any parameters apart from the characteristics mentioned above can be used for computing the unoccupied places in the present disclosure. In an embodiment, the user map computing sub-module 217A maps the position of the participants or the unoccupied places seen on camera in pixels to distance in feet/meters. The user counter computing sub-module 217B counts the participants present in the location and the number of unoccupied chairs in the video conference location.

The speaker identification module 219 identifies the active participant from the one or more participants present in the location of the video conference. In an embodiment, the active participant is a participant speaking in the video conference in real-time. In an embodiment, the speaker identification module 219 identifies the active participant based on the live audio feed from at least one directional microphone of the plurality of directional microphones 109. The at least one directional microphone of plurality of directional microphones 109 are activated whenever a participant sitting in proximity to the directional microphone speaks. In an embodiment, the number of the directional microphones depends on the type of the location. For example, a round table arrangement and a U-shaped table arrangement may require more directional microphones 109 to cover all the participants. In an embodiment, the one or more feeds from the first camera 103 and the computed information associated with the one or more participants may be used to enable at least one directional microphone. In a non-limiting embodiment, the plurality of directional microphones 109 are activated based on a seating configuration, number of the participants available. Also, a weighing factor is derived by the speaker identification module 219 for each directional microphone which is used in computing the speaker directional inputs.

The second camera selection module 221 selects at least one second camera from the plurality of second cameras 105 based on the activated at least one directional microphone. The second camera selection module 221 also identifies initial positions and camera settings for the at least one second camera. Further, the positions identified for the second camera are stored in the database 111. The at least one selected second camera focuses on the active participant identified by the speaker identification module 219.

The camera switching module 223 is responsible for deciding an appropriate view from the at least one second camera of the plurality of cameras 105 and from the third camera 107 based on the live video feed and the computed information. In an embodiment, the camera switching module 223 determines switching to the full view of the location from the third camera 107 in cases such as, more than one participants speak simultaneously, un-stabilized view while switching from one second camera to another second camera, when more than one person talks who are seated in farthest positions etc. A person skilled in the art would understand that any other cases where a switch between the live feeds is required may be considered in the present disclosure. Further, the camera switching module 223 determines the switching of live feeds between the plurality of second cameras 105 within a pre-defined time. For example, when two or more participants speak within a fraction of time in the video conference, the camera switching module 223 determines switching to the full view of the location from the third camera 107.

The layout generation module 225 generates the layout for the video conference dynamically based on the live video feed from the at least one second camera and based on the inputs from the camera switching module 223. In an embodiment, the layout generation module 225 generates a full view of the location provided by the third camera 107 whenever switching of live feeds occurs between the plurality of second cameras 105. In another embodiment, the layout generation module 225 generates a full view of the location provided by the third camera 107 upon determining switching of live feeds between the plurality of second cameras 105 within a pre-defined time.

Figure 3:
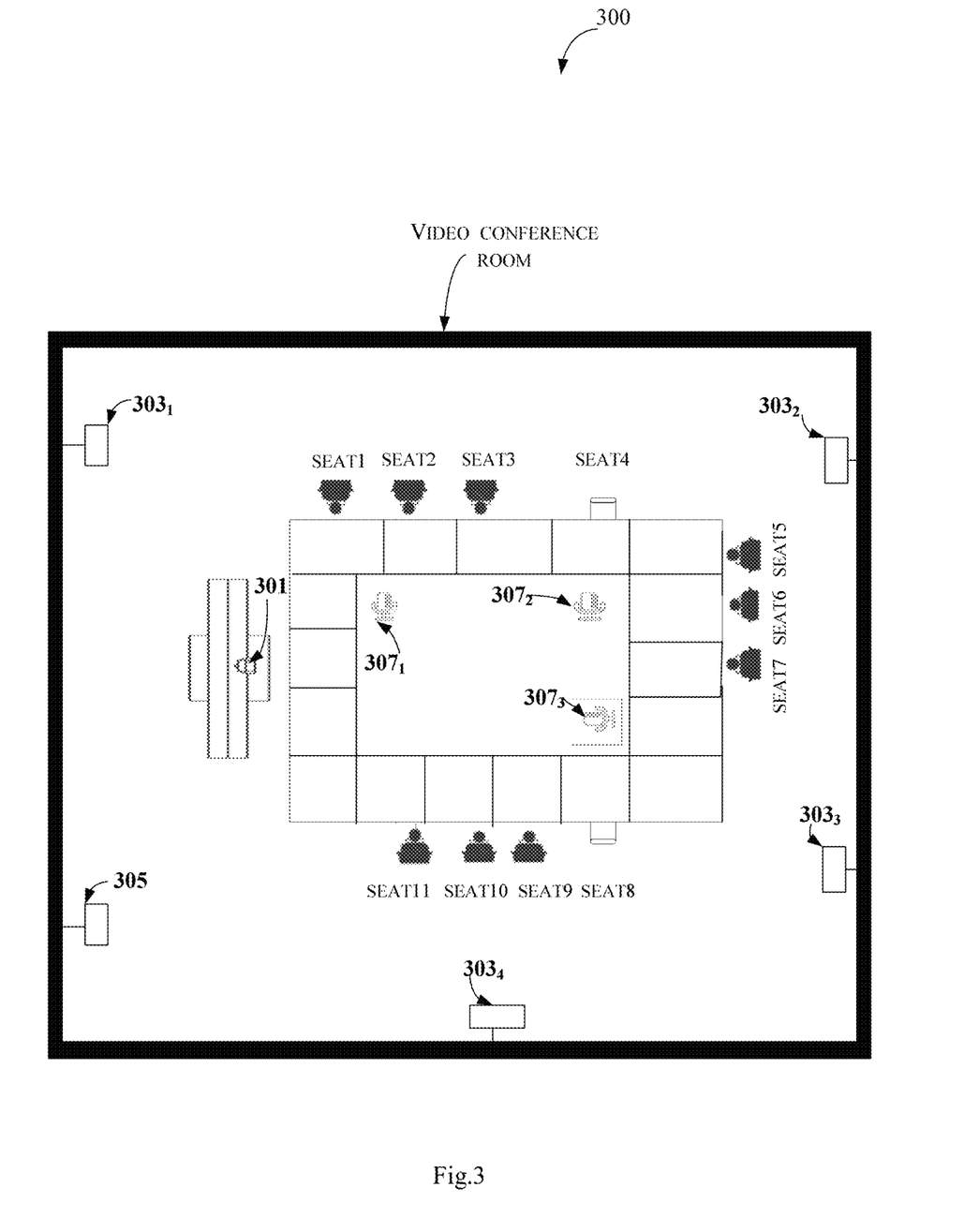
FIG. 3 shows an exemplary representation of a video conference in a location in accordance with some embodiment of the present disclosure.

FIG. 3 shows an exemplary representation of a video conference in a location in accordance with some embodiment of the present disclosure.

As shown in FIG. 3, the environment 300 illustrates a scenario of a video conference in a location in an exemplary embodiment of the present disclosure. The environment 300 illustrates a video conference scenario for a video conference room, where a layout for the video conference is selected dynamically. The environment 300 comprises a video conferencing set-up which consist of a first camera 301, a second camera $303_1$, a second camera $303_2$, a second camera $303_3$, a second camera $303_4$, a third camera 305, a directional microphone $307_1$, a directional microphone $307_2$ and a directional microphone $307_3$. Further, the environment 300 comprises of a rectangular table with one or more participants seated around the table. Initially, a layout selection system (not shown in fig) receives one or more feeds about the video conference room from the first camera 301, which is a top mounted camera. The first camera 301 covers entire conference room and all the participants sitting across the rectangular table. Based on the one or more feeds, the layout selection system computes information associated with the one or more participants sitting across the rectangular table. The layout selection system computes the number of participants currently in the room as eleven along with the seating information of each participant with respect to room coordinates. The room coordinate details are pre-determined and stored in a database connected to the layout selection system (not shown in fig). The layout selection system also determines that three seats are unoccupied along with the seat coordinate. Further, the layout selection module obtains the live audio data from the directional microphones present in the room. For instance, in the FIG. 3, the directional microphone $307_1$ is activated and the live audio data is obtained from the directional microphone $307_1$. The layout selection module identifies the active participant speaking in the room. Based on the live audio data, the layout selection system identifies the active participant as the participant sitting in seat 1. In such case, the layout selection system receives the live video feeds from the second camera $303_4$ which focuses on the participant in seat 1. Also, the corresponding settings of the selected second camera $303_4$ are selected such as zooming in and out of the location to clearly focus on the active participant seated in seat 1. In an embodiment, the layout selection system (not shown in fig) may receive the live video feeds from at least one of the second camera $303_1$, the second camera $303_2$, the second camera $303_3$ and the second camera $303_4$ placed in the location based on the location and the one or more participants in the location. Further, based on the view from the selected second camera $303_4$ and the identified active participant, the layout generation generates the layout for the video conference such that the active participant seated in seat 1 is zoomed and covered for display.

Figure 4:
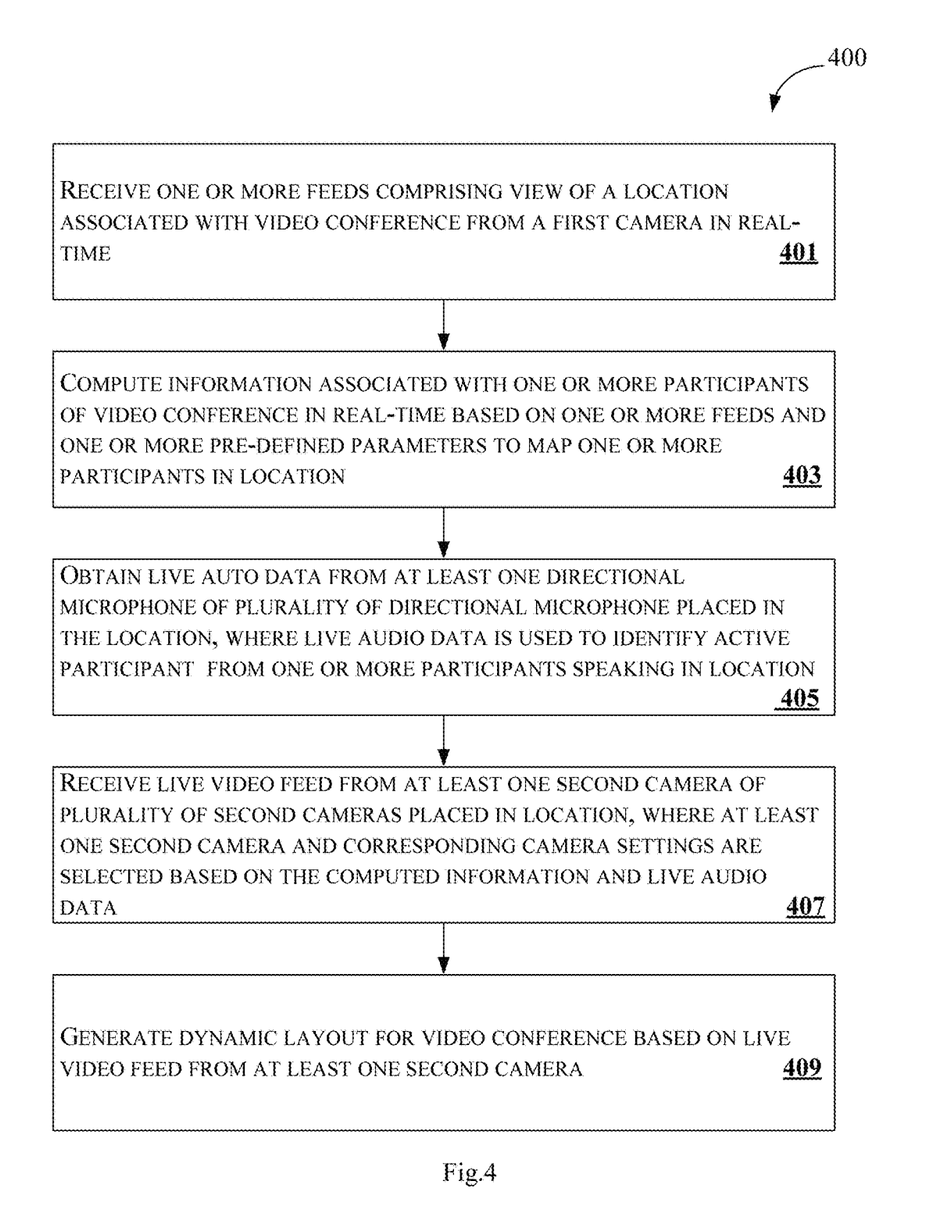
FIG. 4 illustrates a flowchart showing a method for dynamic layout generation in video conferencing system in accordance with some embodiments of present disclosure.

FIG. 4 illustrates a flowchart showing a method for dynamic layout generation in video conferencing system in accordance with some embodiments of present disclosure.

As illustrated in FIG. 4, the method 400 comprises one or more for dynamic layout generation in video conferencing system. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the layout selection system 101 receives one or more feeds comprising top view of the location associated with the video conference from a first camera 103 in real-time.

At block 403, the layout selection system 101 computes information associated with the one or more participants of the video conference in real-time based on the one or more feeds and the pre-determined parameters to map the one or more participants in the location.

At block 405, the layout selection system 101 obtains the live audio data from the at least one directional microphone of the plurality of microphones 109 placed in the location. The live audio data is used to identify the active participant from the one or more participants speaking in the location.

At block 407, the layout selection system 101 receives the live video feed from the at least one second camera of the plurality of second cameras 105 placed in the location. The at least one second cameras and corresponding settings are selected based on the computed information and the live audio data.

At block 409, the layout selection system 101 generates a dynamic layout for the video conference based on the live video feed from the at least one second camera.

Computing System

Figure 5:
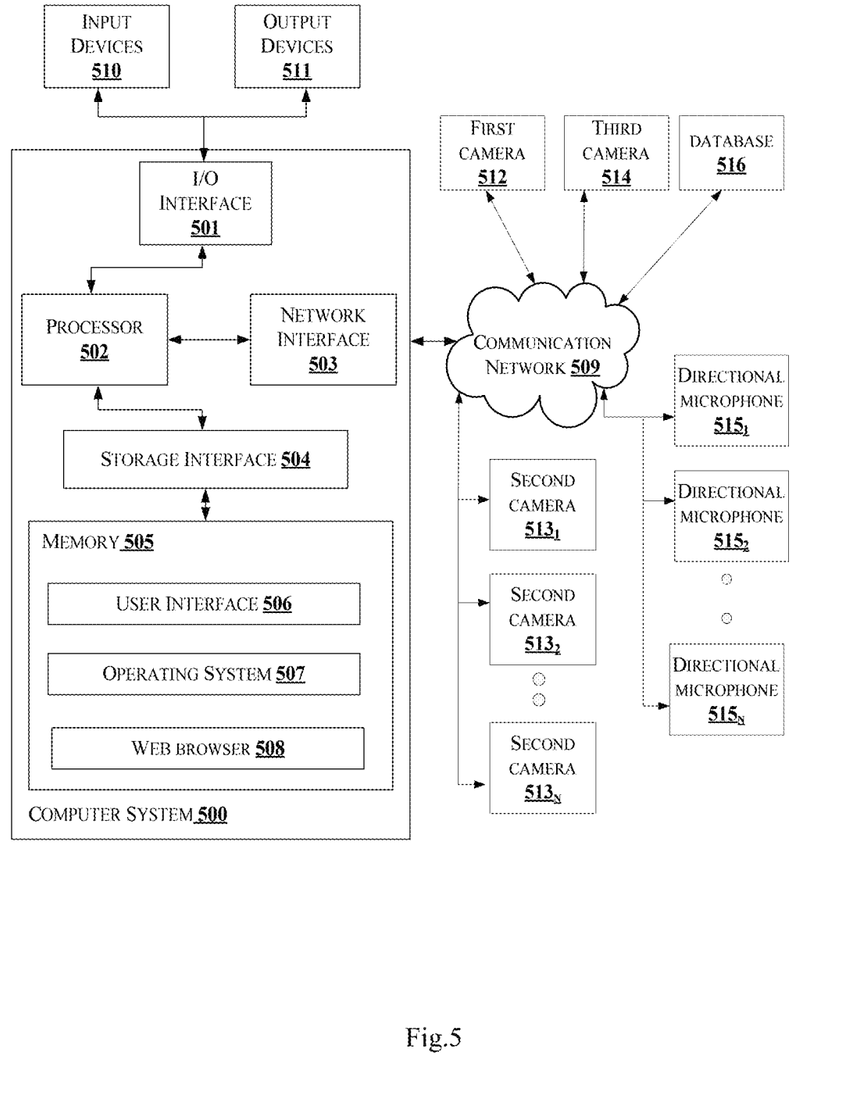
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 is used to implement the layout selection system 101. The computer system 500 may comprise a central processing unit ("CPU" or "processor") 502. The processor 502 may comprise at least one data processor for dynamic layout generation in video conferencing system. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 consists of a layout selection system. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with a first camera 512, a plurality of second cameras 513, a third camera 514, a plurality of directional microphones 515 and a database 516. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, web browser 508 etc. In some embodiments, computer system 500 may store user/application data 506, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

In some embodiments, the computer system 500 may implement a web browser 508 stored program component. The web browser 508 may be a hypertext viewing application, such as, Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 508 may utilize facilities such as, AJAX, DHTML, Adobe Flash, JavaScript, Java, Application Programming Interfaces (APIs), etc. In some embodiments, the computer system 500 may implement a mail server stored program component. The mail server may be an Internet mail server such as, Microsoft Exchange, or the like. The mail server may utilize facilities such as, ASP, ActiveX, ANSI C++/C#, Microsoft .NET, CGI scripts, Java, JavaScript, PERL, PHP, Python, WebObjects, etc. The mail server may utilize communication protocols such as, Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure provides dynamic generation of layout in video conferencing system.

An embodiment of the present disclosure provides appropriate and apt layout by eliminating the empty spaces view and blank seats.

An embodiment of the present disclosure shows and focuses on the active participants speaking in the video conference.

The described operations may be implemented as a method, system or article of manufacture using standard programming and/or engineering techniques to produce software, firmware, hardware, or any combination thereof. The described operations also may be implemented as code maintained in a "non-transitory computer readable medium", where a processor may read and execute the code from the computer readable medium. The processor may be at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for dynamic layout generation in video conferencing system, the method comprising:
   receiving, by a layout selection computing device, one or more feeds comprising top view of a location associated with a video conference set-up from a first camera in real-time;
   computing, by the layout selection computing device, information associated with one or more participants of the video conference set-up in real-time based on the one or more feeds and one or more pre-determined parameters to map the one or more participants in the location and the information associated with the one or more participants further comprises a number of participants, seating information of each of the participants, and unoccupied seats;
   obtaining, by the layout selection computing device, live audio data from at least one directional microphone of a plurality of directional microphones placed in the location, wherein the live audio data is used to identify an active participant from the one or more participants speaking in the location;
   receiving, by the layout selection computing device, live video feed from at least one second camera of a plurality of second cameras placed in the location, wherein the at least one second camera and corresponding camera settings are selected based on the computed information and the live audio data; and
   generating, by the layout selection computing device, a dynamic layout for the video conference set-up based on the live video feed from the at least one second camera.

2. The method as claimed in claim 1, wherein the one or more feeds comprises video details of the entire location associated with the video conference set-up.

3. The method as claimed in claim 1, wherein the at least one second camera of the plurality of second cameras focuses on the active participant of the video conference set-up.

4. The method as claimed in claim 1, wherein the one or more pre-determined parameters comprises coordinate details of the location associated with the video conference set-up.

5. The method as claimed in claim 1, wherein the camera settings comprises zoom details, tilt angle and position for the at least one second camera.

6. The method as claimed in claim 1 further comprising receiving a full view of the location from a third camera, wherein the full view is based on the information associated with one or more participants computed in real-time.

7. The method as claimed in claim 1, wherein the dynamic layout is a full view of the location captured by a third camera during switching of live feeds between the plurality of second cameras.

8. The method as claimed in claim 1, wherein the dynamic layout is a full view of the location captured by a third camera upon determining switching of live feeds between the plurality of second cameras within a predefined time.

9. A layout selection computing device comprising:
   a processor; and
   a memory communicatively coupled to the processor, wherein the memory stores processor instructions, which, on execution, causes the processor to:
   receive one or more feeds comprising top view of a location associated with a video conference set-up from a first camera in real-time;
   compute information associated with one or more participants of the video conference set-up in real-time based on the one or more feeds and one or more pre-determined parameters to map the one or more participants in the location and the information associated with the one or more participants further comprises a number of participants, seating information of each of the participants, and unoccupied seats;
   obtain live audio data from at least one directional microphone of a plurality of directional microphones placed in the location, wherein the live audio data is used to identify an active participant from the one or more participants speaking in the location;

receive live video feed from at least one second camera of a plurality of second cameras placed in the location, wherein the at least one second camera and corresponding camera settings are selected based on the computed information and the live audio data; and generate a dynamic layout for the video conference set-up based on the live video feed from the at least one second camera.

10. The device as claimed in claim 9, wherein the one or more feeds comprises video details of the entire location associated with the video conference set-up.

11. The device as claimed in claim 9, wherein the at least one second camera of the plurality of second cameras focus on the active participant of the video conference set-up.

12. The device as claimed in claim 9, wherein the one or more pre-determined parameters comprises coordinate details of the location associated with the video conference set-up.

13. The device as claimed in claim 9, wherein the camera settings comprises zoom details, tilt angle and position for the at least one second camera.

14. The device as claimed in claim 9, wherein the processor receives a full view of the location from a third camera, wherein the full view is based on the information associated with one or more participants computed in real-time.

15. The device as claimed in claim 9, wherein the dynamic layout is a full view of the location captured by a third camera during switching of live feeds between the plurality of second cameras.

16. The device as claimed in claim 9, wherein the dynamic layout is a full view of the location captured by a third camera upon determining switching of live feeds between the plurality of second cameras within a predefined time.

17. A non-transitory computer-readable medium storing instructions for dynamic layout generation in video conferencing system, wherein upon execution of the instructions by one or more processors, the processors perform operations comprising:

receiving one or more feeds comprising top view of a location associated with a video conference set-up from a first camera in real-time;

computing information associated with one or more participants of the video conference set-up in real-time based on the one or more feeds and one or more pre-determined parameters to map the one or more participants in the location and the computing information associated with the one or more participants further comprises a number of participants, seating information of each of the participants, and unoccupied seats;

obtaining live audio data from at least one directional microphone of a plurality of directional microphones placed in the location, wherein the live audio data is used to identify an active participant from the one or more participants speaking in the location;

receiving live video feed from at least one second camera of a plurality of second cameras placed in the location, wherein the at least one second camera and corresponding camera settings are selected based on the computed information and the live audio data; and generating a dynamic layout for the video conference set-up based on the live video feed from the at least one second camera.

* * * * *